(12) United States Patent
Ricahrdson et al.

(10) Patent No.: US 9,981,241 B2
(45) Date of Patent: *May 29, 2018

(54) REMOVAL OF ATMOSPHERIC POLLUTANTS FROM GAS, RELATED APPARATUSES, PROCESSES AND USES THEREOF

(71) Applicant: Alloys Cleaning, Inc., Los Angeles, CA (US)

(72) Inventors: Robert George Ricahrdson, Shingletown, CA (US); Roger Glenn Miller, Fullerton, CA (US); Larry Kent Barnthouse, Santa Ana, CA (US)

(73) Assignee: ALLOYS CLEANING, INC., Los Angeles, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/087,713

(22) Filed: Mar. 31, 2016

(65) Prior Publication Data

US 2016/0346726 A1     Dec. 1, 2016

Related U.S. Application Data

(63) Continuation-in-part of application No. 14/666,199, filed on Mar. 23, 2015, now Pat. No. 9,757,687, (Continued)

(51) Int. Cl.
*B01D 53/30* (2006.01)
*B01D 53/14* (2006.01)
(Continued)

(52) U.S. Cl.
CPC ............ *B01J 19/006* (2013.01); *B01D 53/50* (2013.01); *B01D 53/56* (2013.01); *B01D 53/60* (2013.01);
(Continued)

(58) Field of Classification Search
CPC ........ B01D 53/1481; B01D 2259/4508; B01D 53/30; B01D 53/14; B01D 53/1493;
(Continued)

(56) References Cited

U.S. PATENT DOCUMENTS 3,023,076 A    2/1962  Karwat
3,482,825 A    12/1969 Bjerkan
(Continued)

FOREIGN PATENT DOCUMENTS

EP          1845425      10/2007
EP          2498148       9/2012
WO          2013180760   12/2013

OTHER PUBLICATIONS

USPTO; Non-Final Office Action dated Jun. 28, 2013 in U.S. Appl. No. 13/727,512.
(Continued)

*Primary Examiner* — Timothy C Vanoy
(74) *Attorney, Agent, or Firm* — Snell & Wilmer L.L.P.

(57) ABSTRACT

One aspect of the invention relates to a method comprising a single-stage conversion of an atmospheric pollutant, such as NO, $NO_2$ and/or $SO_x$ in a first stream to one or more mineral acids and/or salts thereof by reacting with nonionic gas phase chlorine dioxide ($ClO_2^0$), wherein the reaction is carried out in the gas phase. Another aspect of the invention relates to a method comprising first adjusting the atmospheric pollutant concentrations in a first stream to a molar ratio of about 1:1, and then reacting with an aqueous metal hydroxide solution (MOH). Another aspect of the invention relates to an apparatus that can be used to carry out the methods disclosed herein. The methods disclosed herein are unexpectedly efficient and cost effective, and can be applied to a stream comprising high concentration and large volume of atmospheric pollutants.

26 Claims, 5 Drawing Sheets

Related U.S. Application Data which is a continuation of application No. 14/537,834, filed on Nov. 10, 2014, now Pat. No. 9,272,257, which is a continuation of application No. 14/126,403, filed as application No. PCT/US2013/020586 on Jan. 7, 2013, now Pat. No. 8,883,105.

(60) Provisional application No. 61/584,347, filed on Jan. 9, 2012, provisional application No. 61/656,192, filed on Jun. 6, 2012, provisional application No. 61/715,149, filed on Oct. 17, 2012, provisional application No. 61/715,146, filed on Oct. 17, 2012.

(51) Int. Cl.
| | |
|---|---|
| *B01J 19/00* | (2006.01) |
| *B01J 19/24* | (2006.01) |
| *B01D 53/34* | (2006.01) |
| *B01D 53/50* | (2006.01) |
| *B01D 53/56* | (2006.01) |
| *B01D 53/60* | (2006.01) |
| *B01D 53/76* | (2006.01) |

(52) U.S. Cl.
CPC .......... *B01D 53/76* (2013.01); *B01J 19/2405* (2013.01); *B01D 53/30* (2013.01); *B01D 53/346* (2013.01); *B01D 2251/10* (2013.01); *B01D 2251/108* (2013.01); *B01D 2258/06* (2013.01); *B01D 2259/4508* (2013.01)

(58) Field of Classification Search
CPC ........ B01D 2251/108; B01D 2251/604; B01D 2257/302; B01D 2257/404; B01D 2258/06; B01D 53/346; B01D 53/50; B01D 53/56; B01D 53/60; B01D 53/76; B01D 53/00; B01J 19/006; B01J 19/2405
See application file for complete search history.

(56) References Cited

U.S. PATENT DOCUMENTS

| | | | |
|---|---|---|---|
| 3,923,288 A | 12/1975 | King | |
| 3,957,949 A | 5/1976 | Senjo et al. | |
| 3,962,112 A | 6/1976 | Shaheen | |
| 3,965,975 A | 6/1976 | Edmundson | |
| 4,035,470 A | 7/1977 | Senjo et al. | |
| 4,119,702 A | 10/1978 | Azuhata et al. | |
| 5,271,908 A | 12/1993 | Shiban et al. | |
| 5,328,673 A | 7/1994 | Kaczur et al. | |
| 5,529,093 A | 6/1996 | Gallagher | |
| 5,565,180 A | 10/1996 | Spink | |
| 5,639,434 A | 6/1997 | Patrikainen | |
| 5,887,977 A | 3/1999 | Morikawa | |
| 6,187,274 B1 | 2/2001 | Nilsson | |
| 6,241,809 B1 | 6/2001 | Hopkins | |
| 6,623,155 B1 | 9/2003 | Baron | |
| 6,946,021 B2 | 9/2005 | Aoyagi | |
| 7,118,720 B1 | 10/2006 | Mendelsohn et al. | |
| 7,455,820 B2* | 11/2008 | Lee .................. | B01D 53/60 423/235 |
| 7,535,150 B1 | 5/2009 | Wilson | |
| 8,012,438 B2 | 9/2011 | Hutson | |
| 8,425,866 B2 | 4/2013 | Parrish | |
| 8,740,449 B2 | 6/2014 | Kingsford | |
| 8,883,105 B1* | 11/2014 | Miller .................. | B01D 53/60 423/235 |
| 9,144,769 B2 | 9/2015 | Richardson | |
| 9,149,784 B2 | 10/2015 | Miller | |
| 9,272,257 B2 | 3/2016 | Miller et al. | |
| 9,327,235 B2* | 5/2016 | Richardson .......... | B01D 53/56 |
| 9,757,687 B2 | 9/2017 | Miller et al. | |
| 2002/0061270 A1 | 5/2002 | Osbourne | |
| 2004/0005262 A1* | 1/2004 | Takacs .................. | B01D 53/14 423/235 |
| 2004/0131523 A1 | 7/2004 | Takacs et al. | |
| 2004/0237782 A1 | 12/2004 | Decker | |
| 2006/0239878 A1* | 10/2006 | Lee ........................ | B01D 53/60 423/210 |
| 2008/0213148 A1 | 4/2008 | Parrish et al. | |
| 2008/0241030 A1 | 10/2008 | Parrish et al. | |
| 2014/0314648 A1 | 10/2014 | Richardson et al. | |
| 2015/0056117 A1* | 2/2015 | Miller .................. | B01D 53/60 423/235 |
| 2015/0064087 A1 | 3/2015 | Miller et al. | |
| 2015/0185599 A1 | 7/2015 | Mullins | |
| 2015/0224443 A1 | 8/2015 | Richardson | |
| 2015/0238896 A1 | 8/2015 | Miller et al. | |
| 2016/0136574 A1 | 5/2016 | Miller et al. | |
| 2016/0296887 A1 | 10/2016 | Richardson et al. | |
| 2016/0346726 A1 | 12/2016 | Richardson et al. | |

OTHER PUBLICATIONS

USPTO; Non-Final Office Action dated Aug. 29, 2013 in U.S. Appl. No. 13/727,512.
USPTO; Notice of Allowance dated Aug. 14, 2015 in U.S. Appl. No. 13/727,512.
USPTO; Non-Final Office Action dated Aug. 22, 2014 in U.S. Appl. No. 14/126,403.
USPTO; Notice of Allowance dated Oct. 7, 2014 in U.S. Appl. No. 14/126,403.
USPTO; Notice of Allowance dated Aug. 31, 2015 in U.S. Appl. No. 14/531,943.
USPTO; Non-Final Office Action dated May 15, 2015 in U.S. Appl. No. 14/537,834.
USPTO; Notice of Allowance dated Oct. 28, 2015 in U.S. Appl. No. 14/537,834.
USPTO; Non-Final Office Action dated Aug. 17, 2015 in U.S. Appl. No. 14/666,199.
USPTO; Non-Final Office Action dated Sep. 16, 2015 in U.S. Appl. No. 14/666,199.
USPTO; Notice of Allowance dated Jun. 15, 2016 in U.S. Appl. No. 14/666,199.
USPTO; Non-Final Office Action dated Aug. 13, 2015 in U.S. Appl. No. 14/684,948.
USPTO; Notice of Allowance dated Dec. 28, 2015 in U.S. Appl. No. 14/684,948.
USPTO; Non-Final Office Action dated Mar. 13, 2017 in U.S. Appl. No. 15/005,953.
USPTO; Non-Final Office Action dated Jul. 13, 2017 in U.S. Appl. No. 14/945,590.
PCT; International Search Report and Written Opinion dated Jan. 7, 2014 in Application No. PCT/US2013/020586.

* cited by examiner

REMOVAL OF ATMOSPHERIC POLLUTANTS FROM GAS, RELATED APPARATUSES, PROCESSES AND USES THEREOF

CROSS REFERENCE TO RELATED APPLICATIONS

The present application is a continuation-in-part of U.S. patent application Ser. No. 14/666,199, filed Mar. 23, 2015, which is a continuation of U.S. application Ser. No. 14/537,834, filed Nov. 10, 2014, which is a continuation of U.S. application Ser. No. 14/126,403, filed Dec. 13, 2013, now U.S. Pat. No. 8,883,105, which is the national phase under 35 U.S.C. § 371 of prior PCT International Application No. PCT/US2013/020586 which has an International Filing Date of Jan. 7, 2013, which designates the United States of America, and which claims the benefit of U.S. Provisional Application No. 61/584,347, filed Jan. 9, 2012, U.S. Provisional Application No. 61/656,192, filed Jun. 6, 2012, U.S. Provisional Application No. 61/715,149, filed Oct. 17, 2012, and U.S. Provisional Application No. 61/715,146, filed Oct. 17, 2012, all of which are incorporated herein by reference in their entireties, including drawings.

BACKGROUND OF THE INVENTION

1. Field of the Invention

The field of the invention relates to a method for the removal of atmospheric pollutants from a gas stream, and related apparatus, processes and uses thereof.

2. Description of the Background

Atmospheric pollutants are those gases, particles, radicals and other molecules that make their way into the atmosphere from other sources or form in the atmosphere from the chemical reactions of other molecules and energy sources. In general, atmospheric pollutants can damage the atmosphere by contributing to the "greenhouse effect," by breaking down the ozone layer, or by contributing to incidents of asthma and breathing problems. These pollutants are not merely confined to the outside, but can also be found in buildings. For example, many buildings have loading docks near the air intake system. When a truck pulls up to the loading dock, the truck exhaust can be pulled into the air intake system for a building and pollute the indoor air. There are also sources of atmospheric pollutants that originate from materials inside a building, such as carpet, paint, and commonly used chemicals.

Oxides of nitrogen are a group of six compounds. Two members of this group: nitrogen monoxide (NO) and nitrogen dioxide ($NO_2$), together referred to as $NO_x$ hereinafter, are reactive species that are important because they are problematic atmospheric pollutants and subject to regulatory control. The gases are regulated because of the large quantities produced through combustion and other chemical reactions and because of their adverse effects in atmospheric chemistry. More than 2 million tons of $NO_x$ were generated within the United States in 2011. Combustion typically produces 95% NO and 5% $NO_2$. Nitrogen monoxide, NO, is a significant reactive species in an atmospheric system, along with being present in several types of waste gases. It is the key component in the chain oxidation of organics, which is brought about initially by the radical product of the reaction of hydroxyl radical with organic compounds then adding an ozone molecule to the open radical site. NO scavenges an oxygen atom from the radical organic species to form $NO_2$. In ambient air, there are other important mechanisms by which NO is quickly converted to $NO_2$.

$$2NO + O_2 \rightarrow 2NO_2$$

$$k^{298K} = 2.0 \times 10^{-38} \text{ cm}^6 \text{ molecule}^{-2} \text{s}^{-1}$$

$$RO_2 + NO \rightarrow RO + NO_2$$

$$K^{298K} = 7.6 \times 10^{-12} \text{ cm}^6 \text{ molecule}^{-2} \text{s}^{-1}$$

$$HO_2 + NO \rightarrow OH + NO_2$$

$$K^{298K} = 8.3 \times 10^{-12} \text{ cm}^6 \text{ molecule}^{-2} \text{s}^{-1}$$

$$NO + NO_3 \rightarrow NO_2 +_2$$

$$K^{298K} = 1.8 \times 10^{-14} \text{ cm}^6 \text{ molecule}^{-2} \text{s}^{-1}$$

$$NO + NO_3 \rightarrow 2NO_2$$

$$K^{298K} = 3.0 \times 10^{-11} \text{ cm}^6 \text{ molecule}^{-2} \text{s}^{-1}$$

Alternative $NO_x$ Treatment Methodology

Current methods of cleaning air, such as catalytic oxidation, condensation, absorption, and carbon bed adsorption, are in general bulky, expensive, and maintenance intensive. Therefore, a process that could address at least one of these problems found with the currently used methods would be a beneficial next step in the development of better technology for air quality control. An ideal process can control both low and high concentrations of $NO_x$ in the air to be treated.

Carbon Bed Adsorption

Carbon bed adsorption, or adsorption by another material, is a process that does not convert the components of waste gases to other compounds as part of the process. Adsorption is an effective way of reducing the concentration of components in a waste gas stream to a low concentration through attachment to a substrate.

The contaminated gas flows through the bed, where the components of the waste gas can be adsorbed onto the bed material. There are, however, several problems with granular bed adsorption. First, the choice of the bed material is one of the critical factors in the success of the component removal. Activated carbon, molecular sieves, activated alumina, and activated silica are common bed materials, although activated carbon is commercially the material of choice. The composition of the bed material influences which waste gas components will be adsorbed and which components will sneak through the system and into the outlet air stream. Therefore, it is helpful if the operator knows the contaminants of the air sample that is being cleaned.

Second, the adsorption technique does not break down the components of the waste gas into smaller and/or other compounds; it only collects them on the bed material. Once the bed becomes saturated, it must be taken off line and cleaned or replaced. The cleaning process can involve simply steam cleaning the bed, called regeneration, or can involve using a solvent combined with steam cleaning to remove captured waste gas components. The waste products from this process must then be collected and disposed of by an environmentally safe procedure. The most common procedure is to separate the waste gas components from the aqueous phase that was produced by the steam cleaning process. This is time consuming, labor intensive and costly.

Another problem with the adsorption technique is that it requires more than one bed in parallel and sometimes in series. The adsorption process requires beds in parallel so that when one bed becomes saturated, it can be taken off line and the other bed is put into subsequent use. Sometimes, it becomes advantageous to put beds in series so that large concentrations of waste gas components can be removed.

The operator can also put beds made of different materials in series to target different combinations of waste gases. These adsorption beds are quite bulky, since their average depth is one to three feet, therefore this process can be undesirable if space is limited. The arrangement of beds in series and parallel add to the consumption of time, labor and money in cooling and cleaning of the waste and the bed material.

Absorption

Absorption is the process by which part of a gas mixture is transferred to a liquid based on the preferential solubility of the gas in the liquid. This process is used most often to remove acid stack gases, but it is a complex and costly method of control and often includes the added cost and inconvenience associated with the removal of other innocuous components of waste gases. The high cost of the process is based on the choice of the absorbent and the choice of the stripping agent. Absorption is limited in its utility and not widely implemented in small industrial settings.

Electrical Discharges

Plasmas are electrical discharges that form between electrodes. There are five general classes of non-equilibrium plasmas that can be used in some capacity for chemical processing, including synthesis and decomposition: the glow discharge, the silent discharge, the RF discharge, the microwave discharge, and the corona discharge. Each class is specific based on the mechanism used for its generation, the range of pressure that is applicable during its use, and the electrode geometry.

While electrical discharges are effective in breaking down components of waste gases into other compounds and components, they require power sources (in some cases a significant one), may not be able to handle industrial scale treatment without honeycombed and serial designs of the discharges, and are generally designed to combat complicated waste gas streams that comprise various components, including ozone, $NO_x$ and volatile organic compounds.

Wet Scrubbing

For waste gas streams that contain a significant amount of $NO_x$, whether it is an original contaminant or the result of chemical conversion of a volatile organic component, conventional technologies, such as those described earlier, may not be able to efficiently handle the NO load on an industrial scale. Wet scrubbing technologies can handle waste gas streams with significant amounts of $NO_x$. Conventional wet scrubbing technologies for industrial scale $NO_x$ treatment typically treat the $NO_x$ with two, three or more-stage wet scrubbing systems. The most common currently used is a three-stage process: Stage 1 converts NO into $NO_2$. Stage 2 chemically transforms the $NO_2$ into other nitrogen containing compounds. Stage 3 removes odors created in the second stage. Literature shows a number of chemical reactants, some of which are outlined herein, that are utilized in this and other multi-stage $NO_x$ treatment technologies. These include nitric acid and hydrogen peroxide; sodium hydrosulfide and sodium hydroxide, hydrogen peroxide, ozone gas, sodium chlorite solution; and ferric salt solutions and others. All of these have pronounced limitations in operating costs, equipment costs or removal efficiencies.

Catalytic Reactions

Catalysts that can reduce $NO_x$ into innocuous nitrogen compounds are effective on $NO_x$ waste gas streams with low oxygen concentrations, temperatures between 230° C. and 350° C., devoid of heavy metals that poison the catalyst and sulfur compounds that tend to interfere with the catalysts. However, most industrially produced $NO_x$ waste gas streams do not meet these requirements. Thus, the catalyst technology is not applicable.

To this end, it would be desirable to develop a method that converts $NO_x$ in a waste gas stream, and the related apparatus and processes thereof, wherein some embodiments of the method, apparatus, and/or process, when compared to certain known technologies, achieves at least one of the following goals: a) can operate on an industrial scale, b) requires less significant amount of energy from outside sources, c) can process waste gases in the gas phase with low, medium and/or high amounts of humidity (including liquid and/or aqueous phase materials), d) can process waste gases using a liquid stream (e.g. an aqueous stream), e) can treat waste gases containing sulfur, sodium and/or other metal containing compounds f) is more cost efficient relative to the scale of the process g) is easier to install and operate, and h) can effectively operate as a single-stage or two-stage unit.

SUMMARY OF THE INVENTION

One aspect of the invention relates to a first method for converting one or more oxides of nitrogen, and/or one or more oxides of sulfur (i.e., atmospheric pollutants) in a first stream to one or more mineral acids and/or salts thereof, as a result of contacting the first stream with a second stream comprising nonionic chlorine dioxide ($ClO_2^0$) in the gas phase as defined below.

In one embodiment, the second stream comprises a mist stream, liquid stream or a combination thereof wherein $ClO_2^0$ is adsorbed, suspended and/or dissolved in a liquid composition. The second stream may be introduced into the reaction chamber using an atomizer to produce gas phase $ClO_2^0$ to react with the atmospheric pollutants. In certain embodiments, the second stream further comprises a gas stream comprising $ClO_2^0$.

In another embodiment, a method of removing atmospheric pollution compounds from a waste gas stream disclosed herein comprises: providing a single-stage air scrubbing apparatus, providing a waste gas stream (a first stream) having at least one atmospheric pollution compound (e.g. one or more oxides of nitrogen and/or one or more oxides of sulfur), providing at least one additional gas stream, mist stream, liquid stream or combination thereof (a second stream), introducing the first stream and the second stream into the single-stage air scrubbing apparatus at a flow rate and retention time in the reaction vessel that is sufficient to allow for conversion of at least one atmospheric pollution compound via a gas phase reaction.

Another aspect of the invention relates to a second method comprising:

(2a) contacting a first stream comprising NO and/or $NO_2$ with a second stream comprising $ClO_2^0$ to provide a third stream comprising NO and $NO_2$ at a molar ratio of about 1:1; and (2b) contacting the third stream with a fourth stream comprising an aqueous metal hydroxide (MOH) solution that contains a reaction promoter selected from the group comprising NaOCl, $H_2O_2$, $KMnO_4$, $O_3$, $NaClO_2$, $NaClO_3$, CaOCl and combinations thereof in a concentration by weight of about 2% to 6% to convert NO and $NO_2$ to $MNO_2$.

In one embodiment, a method of removing atmospheric pollution compounds from a waste gas steam disclosed herein comprises: providing a two-stage air scrubbing apparatus, providing a waste gas stream (a first stream) having at least one atmospheric pollution compound (e.g. one or more oxides of nitrogen and/or one or more oxides of sulfur), providing at least one additional gas stream comprising $ClO_2^0$ adsorbed, suspended and or dissolved in a liquid or a combination thereof and/or $ClO_2^0$ gas (a second stream) into the first stage of the air scrubbing apparatus at a flow rate and retention time that is sufficient to allow mixing of a first stream comprising NO and/or $NO_2$ with a second stream comprising $ClO_2^0$ to provide a third stream comprising NO and $NO_2$ at a molar ratio of about 1:1. This third stream gas mixture is then introduced into a second reaction apparatus at a flow rate and retention time that is sufficient to allow mixing of the third stream with a fourth stream comprising an aqueous metal hydroxide (MOH) solution that contains a reaction promoter selected from the group comprising NaOCl, $H_2O_2$, $KMnO_4$, $O_3$, $NaClO_2$, $NaClO_3$, CaOCl and combinations thereof in a concentration by weight of about 2% to 6% to convert NO and $NO_2$ to $MNO_2$.

In another embodiment, a method of removing atmospheric pollution compounds from a waste gas stream disclosed herein comprises: providing a two-stage air scrubbing apparatus, providing a waste gas stream (a first stream) having at least one atmospheric pollution compound (e.g. one or more oxides of nitrogen and/or one or more oxides of sulfur), providing at least two additional gas streams, mist streams, liquid streams or combination thereof (a second stream and a fourth stream), introducing the first stream and the second and fourth streams into the two-stage air scrubbing apparatus at a flow rate and retention time in the reaction vessels that are sufficient to allow for conversion of at least one atmospheric pollution compound in a gas phase reaction.

Another aspect of the invention relates to an apparatus that can be used in the methods disclosed herein.

In one embodiment a single-stage air scrubbing apparatus is disclosed that includes: at least one reaction vessel having a first end, a second end, an enclosure, comprising at least one wall, a volume within enclosure and a residence time component, at least one introduction duct that is coupled to the reaction vessel, and a turbulence component; wherein the residence time component is sufficient to allow the conversion of at least one atmospheric pollution compound. In some embodiments, the at least one atmospheric pollution compound comprises one or more oxides of nitrogen, one or more oxides of sulfur or a combination thereof.

Another embodiment discloses a two stage air scrubbing apparatus including at least one reaction vessel for each stage.

DETAILED DESCRIPTION

Figure 1:
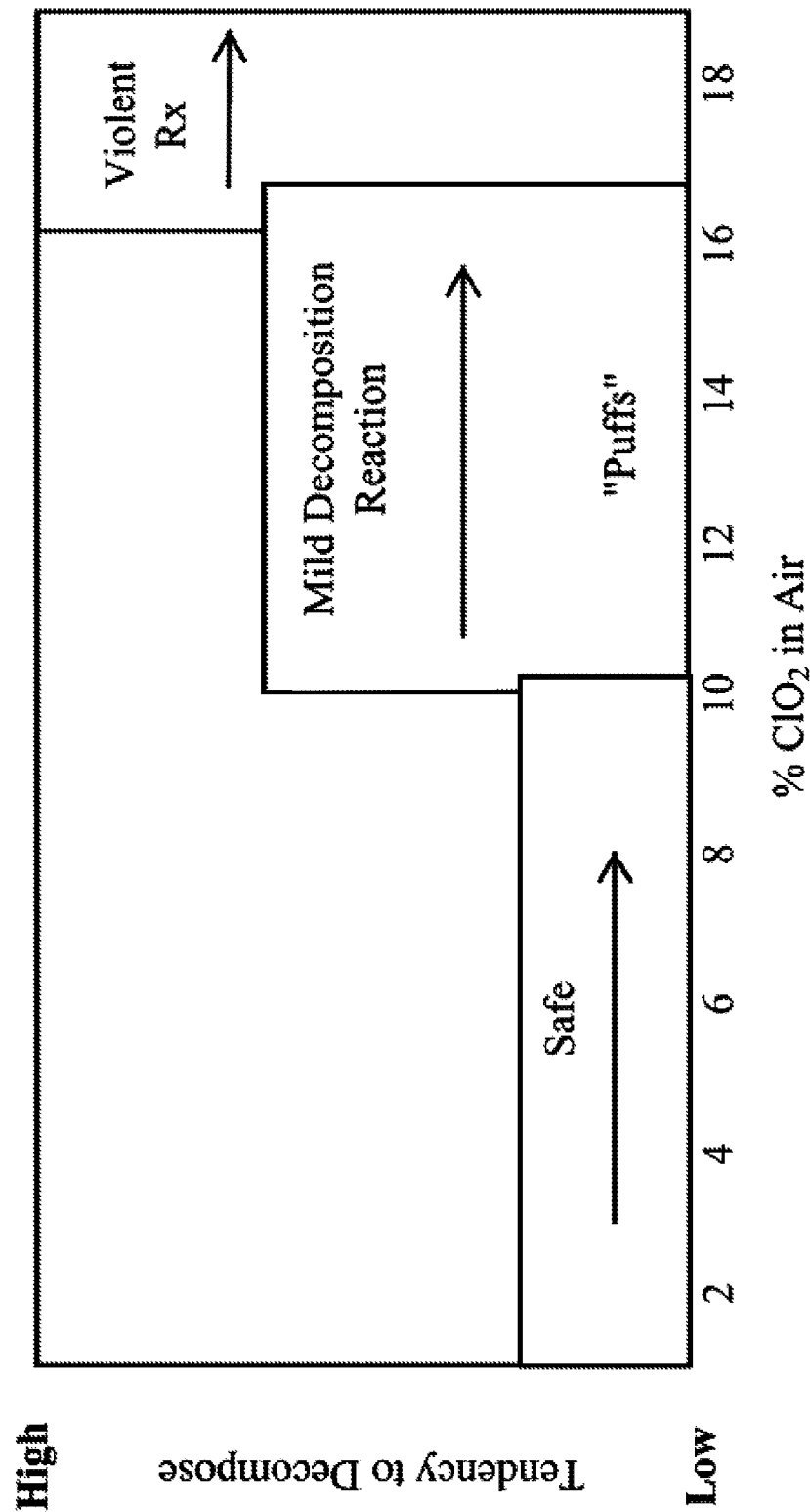
FIG. 1: Chlorine dioxide's tendency to decompose as a function of chlorine dioxide concentration in air (Practical Chlorine Dioxide, Volume 1, Greg. D. Simpson, PhD, Copyright .COPYRGT.2005, pg 12, section titled "Properties of Chlorine Dioxide;" and the OxyChem Technical Data Sheet, Chlorine Dioxide Safety & Handling, titled Partial Pressures vs. $ClO_2$Concentration).

There are three forms of $ClO_2$, the neutrally charged ($ClO_2^0$), the anion carrying a negative charge ($ClO_2^1$) and the cation carrying a positive charge ($ClO_2^+$). Although all the three forms are often referred to as $ClO_2$ or chlorine dioxide in the literature, each has a different name (Table A) and different chemical characteristics.

TABLE A

| $(ClO_2)^0$, $(ClO_2)^-$, and $(ClO_2)^+$ | | | |
|---|---|---|---|
| Preferred IUPAC Name | Ionic charge | Conventional Formula | Formula used in the present disclosure |
| Chlorine dioxide | 0 | $ClO_2$ | $(ClO_2)^0$ |
| Chlorite | −1 | $ClO_2^-$ | $(ClO_2)^-$ |
| Chloryl | +1 | $ClO_2^+$ | $(ClO_2)^+$ |

Chlorine dioxide can be used to convert NO into $NO_2$, typically in a wet scrubbing apparatus, according to reaction (1) below.

$$2NO+ClO_2+H_2O \rightarrow NO_2+HNO_3+HCl \qquad (1)$$

The use of sodium chlorite in water solution within a packed bed, tray type scrubbing, or other wet scrubbing apparatus to convert $NO_2$ into nitric acid, is described in reaction (2) below.

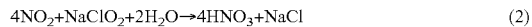
$$4NO_2+NaClO_2+2H_2O \rightarrow 4HNO_3+NaCl \qquad (2)$$

Reactions (1) and (2) are typically described in wet scrubbing reactions using chlorite salts in aqueous solutions. Wet scrubbing methods utilize $ClO_2^-$ provided from the dissociation of the chlorite salts (e.g. sodium chlorite) in an aqueous environment for wet scrubbing of $NO_x$. However, the literature studies frequently inaccurately identify the mechanism as described in reaction 1, wherein the chlorine dioxide reactant is inaccurately identified as the neutral $ClO_2$ ($ClO_2^0$) rather than the correct chlorite ion ($ClO_2^-$).

Reactions (1) and (2) are examples of stoichiometry taken from literature that inaccurately identify the ionic chlorine dioxide molecule. In these reactions and other similar ionic reactions, when $ClO_2$ is depicted it should more accurately be reported as: $ClO_2^-$. For additional clarification, the $ClO_2^-$ ion may be formed from dissolving or suspending a chlorite salt (e.g. sodium chlorite ($NaClO_2$)) in water.

In several embodiments of the present disclosure and without being limited by any theory, the $NO_x$ scrubbing undergoes the reactions described in reactions (3) and (4), set forth below, wherein $ClO_2$ refers to the neutral non-ionic chlorine dioxide $ClO_2^0$. Thus, some embodiments of the present disclosure differ from the known wet scrubbing technology because the scrubbing agents are different: in the known wet scrubbing technology, the scrubbing agent is the anionic $ClO_2^-$; while in some embodiments described herein, the scrubbing agent is the neutral $ClO_2^0$. Furthermore, because the anionic $ClO_2^-$ and the neutral $ClO_2^0$ have different chemical characteristics, such differences provide the embodiments of the present disclosure unexpected advantages over the known wet scrubbing technology.

First Method: Single-Stage Conversion of $NO_x$

One aspect of the invention relates to a first method comprising contacting a first stream comprising NO and/or $NO_2$ (together referred to as $NO_x$) with a second stream to convert the $NO_x$ in the first stream to one or more mineral acids and/or salts thereof in a single-stage conversion, wherein:

(1a) the second stream comprises $ClO_2^0$ adsorbed, suspended and/or dissolved in a liquid composition; and/or (1b) the second stream comprises a gas stream comprising $ClO_2^0$.

In certain embodiments, the first stream contacts the second stream at varying humidities, including at a high relative humidity, at a medium relative humidity, or at a low relative humidity.

Without being limited by any theory, in one embodiment, the method described above involves the following reactions between $NO_x$ and nonionic $ClO_2^0$:

$$5NO+2(ClO2)^0+H_2O \rightarrow NO_2+2HCl \quad (3)$$

$$5NO_2+(ClO_2)^0+H_2O \rightarrow 5HNO_3+HCl \quad (4)$$

Reactions (3) and (4) are different from reactions (1) and (2). The reactant $ClO_2$ in reactions (3) and (4) is nonionic chlorine dioxide ($ClO_2^0$), while the reactant $ClO_2$ in reactions (1) and (2) is $ClO_2^1$. Reaction (5) describes a method of creating $ClO_2^-$:

$$NaClO_2 \rightarrow Na^+ + (ClO_2)^- \quad (5)$$

Without being limited by any theory, reactions (1) and (2) follow different reaction mechanisms from reactions (3) and (4). Reactions (1) and (2) are much slower and reach a lower equilibrium concentration of products (the reactions do not consume all of the reactants). Reactions (3) and (4) produce a higher concentration of products than reactions (1) and (2) do, and therefore use up more reactants. Thus, compared to the conventional wet scrubbing of $NO_x$ based on reactions (1) and (2), the methods described herein based on reactions (3) and (4) allow a more efficient and faster $NO_x$ scrubbing. Thus, the methods described herein can be used in $NO_x$ scrubbing at an industrial scale, and may also be used in $NO_x$ scrubbing of gas stream comprising high concentration $NO_x$.

In certain examples, the concentration of $NO_x$ treated according to reactions (3) and (4) is about 10 ppmV or higher, about 200 ppmV or higher, about 20,000 ppmV or higher, about 50,000 ppmV or higher, or about 60,000 ppmV or higher in the first stream. The possible $NO_x$ concentration mixtures in the first stream include any ratio of NO to $NO_2$; however the ratio is typically about 90% or more NO in industrial and combustion sources. When $ClO_2^0$ is provided in an excess amount, and the contact time is about or longer than the required contact time, reactions (3) and (4) produce substantially complete conversion (about 95% or higher conversion, about 98% or higher conversion, or about 99% or higher conversion) of $NO_x$ to the one or more mineral acids and/or salts thereof. The required contact time between $ClO_2^0$ and $NO_x$ is referred to as a residence time. The residence time is dependent upon the efficiency of gas mixing and the form in which $ClO_2^0$ is introduced into the reaction. The reaction can occur at any velocity of the first stream.

In certain embodiments, the throughput of the method is unexpectedly high, wherein the velocity of the first stream can be up to about 2,500 ft/min, up to about 2,000 ft/min, up to about 1,500 ft/min, or up to about 1,000 ft/min. The contact time required to substantially complete the conversion of $NO_x$ in the first stream to the one or more mineral acids and/or salts thereof is unexpectedly short, e.g., about 3 seconds, about 1.5 seconds or shorter when $ClO_2^0$ is introduced in a liquid or mist stream and the two streams are combined in a way that produces an ideal mixing; or about 0.15 seconds or shorter when $ClO_2^0$ is introduced in a gas stream and the two streams combine in a way to produce an ideal mixing.

The second stream comprising a gas stream, a mist stream, or a liquid stream is combined with the first stream in a way that provides mixing, e.g. by swirl or turbulence. Such swirl or turbulence may be introduced before or after the first stream contacts the second stream, and/or during the contacting thereof. Moreover, such swirl or turbulence may be introduced in either the first or second streams prior to contact between the streams. Such swirl or turbulence may be accomplished by spinning with a mechanical mixing device (e.g. paddles or blades) that induces rotation along the longitudinal axis of the first and second stream flows, by angular orientation of jets that introduce the second stream into the first stream, or by vibrational methods. In certain embodiments, the streams are introduced by one or more nozzles. When there is more than one nozzle, the nozzles can be spun in the same or different directions. In certain embodiments, the multiple nozzles are spun in opposite directions to optimize mixing and minimize unnecessary turbulence.

In one embodiment the second stream comprises $ClO_2^0$ in a gas stream. In another embodiment, the second stream comprises $ClO_2^0$ gas adsorbed, suspended and/or dissolved in a mist stream, a liquid stream or a combination thereof, wherein the liquid evaporates upon introduction into the reaction vessel via an atomizer prior to contacting the first stream. In another embodiment the second stream comprises $ClO_2^0$ in a gas stream; and $ClO_2^0$ gas adsorbed, suspended and/or dissolved in a mist stream, a liquid stream or a combination thereof, wherein the liquid evaporates upon introduction into the reaction vessel via an atomizer prior to contacting the first stream. In some embodiments the second stream is substantially free of the ionic forms of chlorine dioxide.

The liquid composition may be water based (aqueous) or organic based (i.e. comprising one or more organic solvents that do not react with $ClO_2^0$ at a temperature between about 10° C. and about 50° C.). The liquid composition may be acidic, neutral, about neutral, or basic. The rate of reaction between $ClO_2^0$ and $NO_x$ in a liquid stream or a mist stream reaction is dependent upon the Henry's Law constant for the solubility of $ClO_2^0$ in the liquid or mist stream, and the other compound(s) thereof.

For example, the liquid composition may be a basic aqueous solution to provide higher solubility of $ClO_2^0$ (e.g. pH of about 9 or higher). Although $ClO_2^0$ may decompose in a basic aqueous solutions, the $ClO_2^0$ decomposition rate is slower than the reaction rate of reactions (3) and/or (4). Nevertheless, it is desired to limit the time $ClO_2^0$ is exposed to the basic aqueous solution to minimize $ClO_2^0$ decomposition.

For example, the second stream may be formed by mixing the basic aqueous solution and $ClO_2^0$ gas together right before contacting the first stream. In one example, the basic aqueous solution and $ClO_2^0$ gas is mixed together before forming the mist stream. In another example, the second stream is formed by mixing a mist stream of the basic aqueous solution with $ClO_2^0$ gas. In another example, $ClO_2^0$ contacts the basic aqueous solution for no more than about 2 minutes before, or no more than about 10 minutes before contacting the first stream.

Even when the aqueous solution is not basic, it is desired to limit the contact time of $ClO_2^0$ and the aqueous solution before contacting the first stream. In one example, $ClO_2^0$ contacts the aqueous solution (acidic, neutral or substantially neutral) for no more than two minutes, for no more than about 30 minutes, or for no more than about 48 hours before contacting the first stream. In each case wherein $ClO_2^0$ is suspended, adsorbed, or dissolved into a liquid stream, the reaction nonetheless is carried out in the gas phase. For example, the aqueous solution adsorbed, suspended and/or dissolved with $ClO_2^0$ may be converted into a mist stream via an atomizer such that the $ClO_2^0$ evaporates to provide gas phase $ClO_2^0$ before contacting the first stream.

Examples of the aqueous basic solutions include, without limitation, metal hydroxide (MOH) aqueous solutions. As used herein, MOH includes M having single or multiple valences. Examples of MOH include, without limitation, LiOH, NaOH, KOH, $Ca(OH)_2$, and $Ba(OH)_2$MOH, e.g. sodium hydroxide, may be considerably less expensive than $ClO_2^0$ and its presence may reduce the overall chemical cost in the $NO_x$ scrubbing methods described herein. Furthermore, MOH aqueous solutions may be easier and safer to handle than $ClO_2^0$.

The liquid stream can be formed by adsorbing, suspending and/or dissolving $ClO_2^0$ in a liquid composition.

The mist stream can be provided by any methodology for droplet formation (e.g. spray, release or propel), wherein the method provides for evaporation of all or part of the $ClO_2^0$ prior to contacting the first stream. Preferably, the mist droplets are generated using one or multiple air atomized nozzle in which air pressure or sonic vibration provides the energy to create the small droplets. In certain examples, the mist droplets have a mean diameter of about 200 microns or lower, or about 100 microns or lower. In certain examples, a swirl or turbulence is introduced into the combined first and second streams. In certain examples, the mist stream comprises a mist of the liquid composition that contains adsorbed, suspended and/or dissolved $ClO_2^0$. The liquid composition is the same as described supra.

In certain embodiments, the second stream is provided by the following steps:

1a-1a) providing $ClO_2^0$ adsorbed, suspended and/or dissolved in a liquid composition; and 1a-1b) spraying the liquid composition adsorbed, suspended and/or dissolved with $ClO_2^0$ to provide the second stream which evaporates prior to contact with the first stream.

The liquid composition is described the same as above.

In certain embodiments, the second stream is provided by the following steps:

1a-2a) providing $ClO_2^0$ gas on site;

1a-2b) adsorbing, suspending and/or dissolving $ClO_2^0$ gas into a liquid composition; and 1a-2c) spraying the liquid composition adsorbed, suspended and/or dissolved with $ClO_2^0$ gas to provide the second stream which evaporates prior to contact with the first stream.

The liquid composition is described the same as above.

$ClO_2^0$ may be provided from any suitable methods. In certain embodiments, $ClO_2^0$ is produced from $NaClO_2$ by an electrochemical method. In another embodiment, $ClO_2^0$ is produced from a chemical method. In another embodiment, $ClO_2^0$ is produced in a liquid composition. In certain embodiments the reaction products obtained from the production of $ClO_2^0$ can be used in another portion of the methods disclosed herein.

$ClO_2^0$ may be unstable and explosive under certain circumstances. $ClO_2^0$ may be generated in situ to avoid further transportation. The stability of $ClO_2^0$ depends on three primary parameters: temperature, pressure and concentration. In general, $ClO_2^0$ is less stable at a higher temperature, higher pressure and/or higher concentration. There are a number of safe operating environments for $ClO_2^0$. Tables (1) and (2) depict the safe working environments and environments that promote decomposition characteristics of $ClO_2^0$. With good abatement equipment design that effectively maintains temperatures, pressures and $ClO_2^0$ concentrations within the desired parameters, it is possible to treat the first stream having a $NO_x$ concentration of about 40,000 ppmV or less, about 50,000 ppmV or less, or about 60,000 ppmV at a temperature at or below about 38° C. using reactions (3) and (4) within the stable $ClO_2^0$ gas phase parameters outlined in Tables (1) and (2). With good abatement equipment design that minimizes reaction residence times and effectively maintains temperatures, pressures and $ClO_2^0$ concentrations within the desired parameters, it is possible to treat the first gas streams at a temperature at or below about 80° C. using reactions (3) and (4), even though this temperature is not within the area identified as safe in FIG. 2. This is possible because with proper abatement equipment design, reactions (3) and (4) may be completed before significant amount of $ClO_2^0$ begins decomposition.

Because $ClO_2^0$ can be unstable, it is desired to generate $ClO_2^0$ on site by a suitable means. Furthermore, a short distance between the source of $ClO_2^0$ generation and its use in the reaction chamber is desired such that a short transportation time (e.g. about 1 minute or less, about 30 seconds or less, or about 10 seconds or less) is preferred to insure that $ClO_2^0$ reaches the reaction chamber and completes the reaction before reaching the decomposition time outlined in FIG. 2. As described above, the conversion of $NO_x$ to the one or more mineral acids and/or salts thereof can be substantially complete in about 1.5 seconds or less, or 0.15 seconds in the methods disclosed herein.

Figure 2:
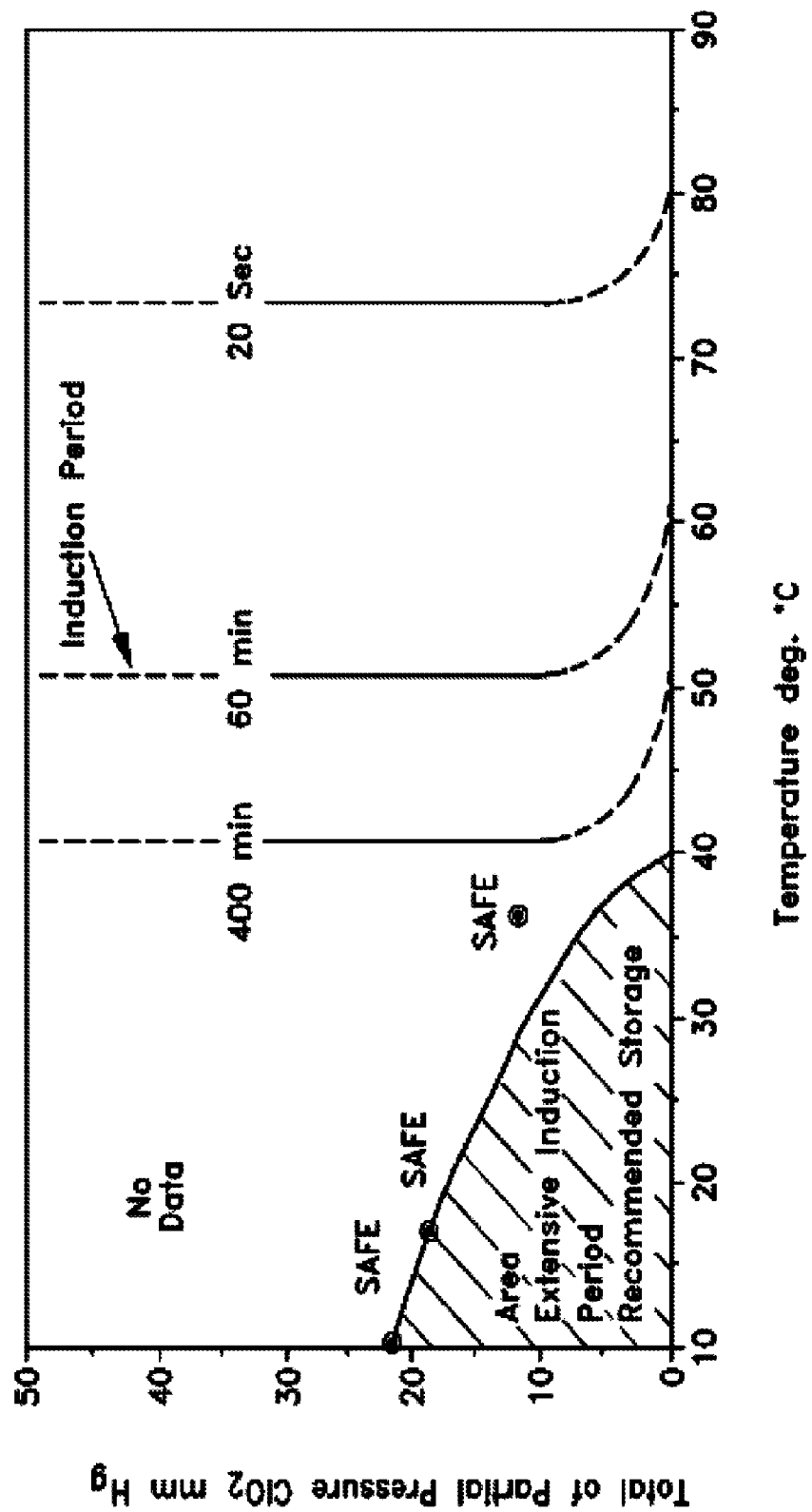
FIG. 2: Induction time of chlorine dioxide, the time required for decomposition of chlorine dioxide, as a function of time, partial pressure, and temperature.

In certain embodiments, as a reference, a 10% $ClO_2^0$ concentration in a gas composition in FIG. 1 corresponds to a partial pressure of 76 mm Hg in FIG. 2, which is outside of the safe working environment. A 5% $ClO_2^0$ concentration in a gas composition in FIG. 1 is well within the safe working environment according to FIG. 2. FIG. 1 shows that $ClO_2^0$ is theoretically safe at up to 9.55% (95,500 ppmV) in a gas composition when used in environments optimized for minimum $ClO_2^0$ decomposition.

Figure 3:
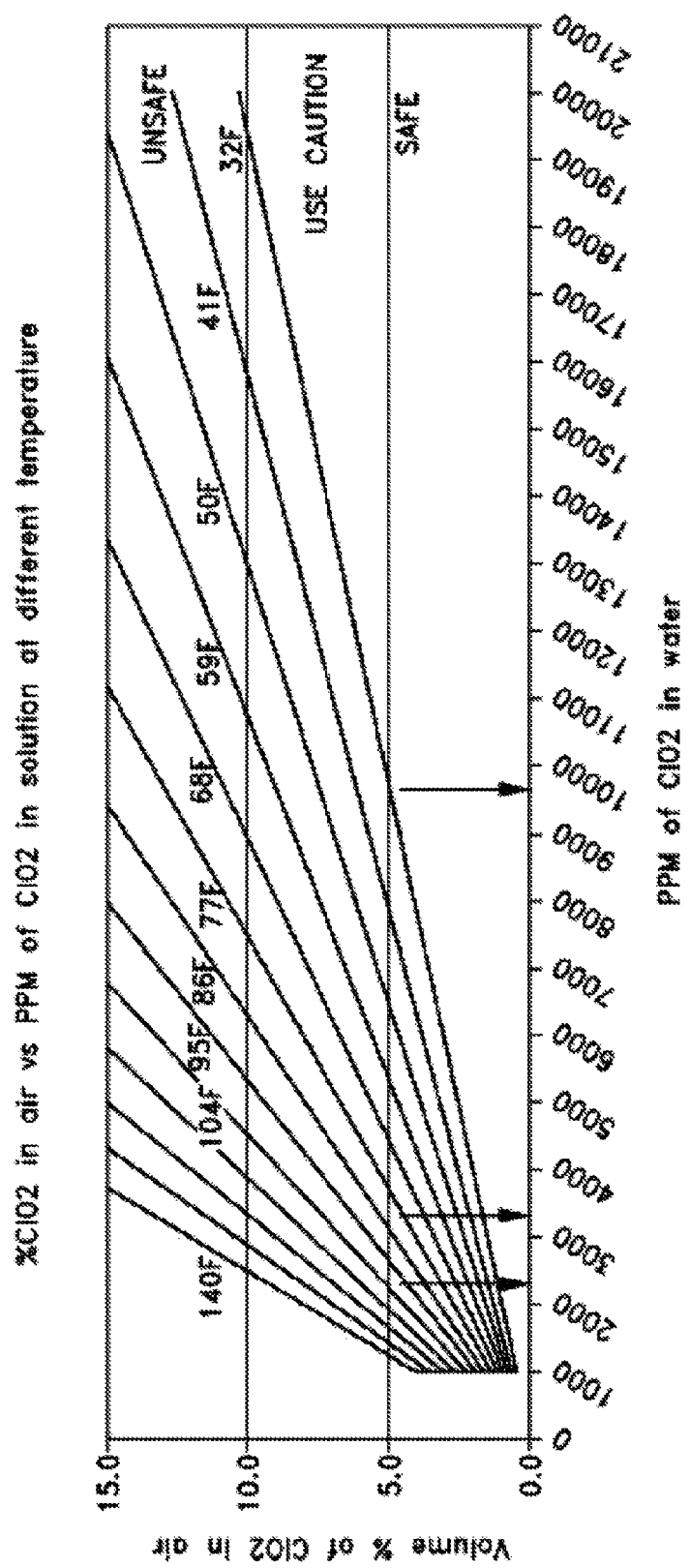
FIG. 3: Chlorine dioxide vapor pressure as percent in air at various temperatures.

FIG. 3 shows that the safe concentration of $ClO_2^0$ in an aqueous solution varies with temperature. For example, thousands of gallons of $ClO_2^0$ adsorbed, suspended and/or dissolved in water at a concentration of about 9,000 ppmV can be stored safely at near freezing temperature. $ClO_2^0$ may be safe for transportation and general storage at a concentration of about 3,000 ppmV at or below about 30° C. However, the safe concentration of $ClO_2^0$ in water at 40° C. is about 2,200 ppmV. Furthermore, other conditions including, without limitation, sunlight and vibrations also may affect the $ClO_2^0$ stability in aqueous solution.

In certain embodiments, the adsorbed, suspended and/or dissolved $ClO_2^0$ concentration in the aqueous solution is about 4,000 ppmV or lower, about 3,000 ppmV or lower, or about 2,000 ppmV or lower. In certain embodiments, the aqueous solution is a basic aqueous solution with a pH of about 9 or above. In certain embodiments, the method further comprises determining the amount/rate of $ClO_2^0$ addition in the second stream based on the concentration of $NO_x$ in the first stream.

To ensure the conversion of $NO_x$ to one or more mineral acids and/or salts thereof occurs at a desired removal efficiency, the amount of $ClO_2^0$ used can be above the stoichiometric amount based on reactions (3) and (4) (e.g. about 10% to about 20% higher). In certain embodiments, the method further comprises determining the NO and/or $NO_2$ concentration(s) in the first stream before and/or after the first stream contacting the second stream and leaving the reaction chamber; then determining the stoichiometric amount of $ClO_2^0$ needed in the second stream; and optionally determining the $ClO_2^0$ concentration in the stream leaving the reaction chamber before determining the stoichiometric amount of $ClO_2^0$ needed in the second stream. In certain embodiments, the method further comprises determining the $NO_x$ concentration in the first stream after contacted with the second stream and/or the pH of the liquid condensate formed as a result of first and second stream mixing to determine the amount of $ClO_2^0$ and/or the basic aqueous solution needed in the second stream.

In certain embodiments, the second stream further comprises $ClO_2^0$ gas when the $NO_x$ concentration in the first stream requires more $ClO_2^0$ than can be safely adsorbed, suspended and/or dissolved into an aqueous solution, or when the humidity of the second stream precludes the addition of more aqueous solution containing $ClO_2^0$ gas without causing condensation within the reaction chamber.

In certain embodiments, when the ambient relative humidity is not sufficient, the method further comprises spraying, releasing or propelling finely atomized mist of water or an aqueous solution at a point upstream of the $ClO_2^0$ addition.

In certain embodiments, the method further comprises contacting the treated first stream within the reaction chamber or in another reaction chamber after the treated first steam leaves the reaction chamber with another stream to enhance the capture of hydrochloric acid, nitric acid, other mineral acids, and/or $ClO_2^0$. Examples of such stream include, without limitation, an aqueous solution (e.g. basic, acidic, neutral or substantially neutral). In certain examples when the desired final products are salts of the mineral acids (e.g. hydrochloric acid and nitric acid), the other stream comprises the corresponding basic aqueous solution to form the desired salts thereof. In certain examples when the desired final products are the mineral acids (e.g. hydrochloric acid and nitric acid), the other stream comprises an acidic or substantially neutral aqueous solution.

In another embodiment, a method of removing atmospheric pollution compounds from a waste gas stream disclosed herein include: providing a single-stage air scrubbing apparatus, providing a waste gas stream (a first stream) having at least one atmospheric pollution compound (e.g. one or more oxides of nitrogen and/or one or more oxides of sulfur), providing at least one additional gas stream, mist stream, liquid stream or combination thereof (a second stream), introducing the first stream and the second stream into the single-stage air scrubbing apparatus at a flow rate and retention time in the reaction vessel that is sufficient to allow for conversion of at least one atmospheric pollution compound in a gas phase reaction.

Second Method: Two-Stage Conversion of $NO_x$ to $MNO_2$

Another aspect of the invention relates to a second method comprising:

(2a) contacting a first stream comprising NO and/or $NO_2$ with a second stream comprising $ClO_2^0$ to provide a third stream comprising NO and $NO_2$ at a molar ratio of about 1:1; and (2b) contacting the third stream with a fourth stream comprising an aqueous metal hydroxide (MOH) solution to convert NO and $NO_2$ to $MNO_2$.

In one embodiment, the metal hydroxide MOH is NaOH, and the reaction involved in step 2b includes, without limitation, reaction (6):

$$NO+NO_2+2NaOH \rightarrow 2NaNO_2+H_2O \qquad (6)$$

Similar reactions are involved when the metal hydroxide is a different metal hydroxide. Examples of MOH are the same as described supra with respect to the first method.

The first stream and the second stream in step 2a can be the same as described supra with respect to the first method, except that the rate/amount of $ClO_2^0$ in the second stream is provided to obtain the about 1:1 molar ratio of $NO/NO_2$ in the third stream. The $ClO_2^0$ in the second stream can react with NO and/or $NO_2$ via reactions (3) and/or (4). Although both reactions (3) and (4) are fast reactions, the rate of reaction (3) is significantly faster than that of reaction (4). Thus, the relative concentration of NO and $NO_2$ can be adjusted by adding just enough $ClO_2^0$ to preferably convert NO to $NO_2$ (reaction (3)) while not enough to further convert $NO_2$ to nitric acid and/or salts thereof (reaction (4)).

In another embodiment, the method further comprises determining the concentrations of NO and $NO_2$ in the first stream before contacting the second stream and using this information to determine the required addition of $ClO_2^0$ to the second stream that will produce about 1:1 molar ratio of $NO/NO_2$ in the resultant third stream. In certain embodiments, the amount of $ClO_2^0$ used is above the stoichiometric amount based on reaction (3) (e.g. about 10% to about 20% higher).

In another embodiment, the method further comprises determining the concentrations of NO and $NO_2$ in the third stream after the contacting and mixing of the first and the second streams. This concentration information is used to determine the required addition of $ClO_2^0$ to the second stream that will produce about 1:1 molar ratio of $NO/NO_2$ in the resultant third stream.

In another embodiment, the aqueous metal hydroxide (MOH) solution of step (2b) further comprises one or more oxidants to further facilitate the desired conversion. Examples of such oxidants include, without limitation, NaOCl, $NaClO_2$, $NaClO_3$, $H_2O_2$, $KMnO_4$, and combinations thereof. In certain examples, the amount of the total oxidant(s) is about 2% to about 6% by weight of the aqueous metal hydroxide (MOH) solution.

In another embodiment, the fourth stream of step (2b) comprises the aqueous metal hydroxide (MOH) solution and one or more oxidants described supra. In one example, the fourth stream is provided by spraying, releasing, or propelling the aqueous metal hydroxide (MOH) solution and the one or more oxidants. In another example, the aqueous metal hydroxide (MOH) solution and the one or more oxidants are mixed before the spraying, releasing or propelling. In another example, the aqueous metal hydroxide (MOH) solution and the one or more oxidants are not mixed before the spraying, releasing or propelling. In another example, the mist stream has a mean diameter of about 200 microns or lower, or about 100 microns or lower. The mist droplets can be generated using any droplet forming technology as described supra with respect to the first method.

The method described herein uses $ClO_2^0$ to convert excess NO to $NO_2$, and uses the less expensive and easier to handle chemical, the aqueous metal hydroxide (MOH) solutions (e.g. NaOH aqueous solution), to further complete the conversion of NO and $NO_2$ to an innocuous compound (e.g. $NaNO_2$). Furthermore, the $NaNO_2$ produced from the method can be further purified as a commercial chemical product.

The required contacting time of the first stream and the second stream of the second method is about the same or shorter compared to that required in the first method. The handling considerations of $ClO_2^0$ in the second method are the same as those described in the first method. The concentration ranges of $ClO_2^0$ suitable for the second method are about the same or lower than those suitable for the first method.

Furthermore, when $ClO_2^0$ is generated using an electrochemical device, the effluent from the cells can be utilized in the second scrubbing stage to minimize the addition of NaOH in step (2b).

In another embodiment, a method of removing atmospheric pollution compounds from a waste gas steam disclosed herein comprises: providing a two-stage air scrubbing apparatus, providing a waste gas stream (a first stream) having at least one atmospheric pollution compound (e.g. one or more oxides of nitrogen and/or one or more oxides of sulfur), providing at least one additional gas stream, mist stream, liquid stream or combination thereof (a second stream/a fourth stream) into each stage of the air scrubbing apparatus at a flow rate and retention time in each reaction vessel that is sufficient to allow for conversion of at least one atmospheric pollution compound into another innocuous nitrogen or sulfur containing compound.

In another embodiment, a method of removing atmospheric pollution compounds from a waste gas stream disclosed herein comprises: providing a two-stage air scrubbing apparatus, providing a waste gas stream (a first stream) having at least one atmospheric pollution compound (e.g. one or more oxides of nitrogen and/or one or more oxides of sulfur), providing at least two additional gas streams, mist streams, liquid streams or combination thereof (a second stream and a fourth stream), introducing the first stream and the second and fourth streams into the two-stage air scrubbing apparatus at a flow rate and retention time in the reaction vessels that are sufficient to allow for conversion of at least one atmospheric pollution compound.

Advantages of the Methods Disclosed Herein

The methods disclosed herein treat $NO_x$ more efficiently and with lower initial equipment/operating costs than the prior art processes. The methods disclosed herein provide unexpected improvements in the treatment of industrially created $NO_x$ waste gas with unexpectedly short treating time, unexpectedly high throughput and unexpectedly high efficiency. The methods disclosed herein are applicable to industrial applications including, without limitation, chemically dissolving and pickling metals, stationary source combustion process flue gas, tail gas from nitric acid plants, shipboard combustion process flue gas and other sources of waste gas containing one or more oxides of nitrogen.

Apparatus Used in the Methods Disclosed Herein

Another aspect of the invention relates to an apparatus that can be used in the methods disclosed herein.

In one embodiment, the apparatus comprises a single-stage air/mist scrubbing apparatus that is a major departure from the conventional multi-stage wet scrubbing apparatus.

Specifically, the single-stage air/mist scrubbing apparatus is used for the contact/reaction of $ClO_2^0$ with NO and/or $NO_2$. Such apparatus may also be used at the first stage in the two-stage methods disclosed herein. The single-stage air/mist scrubbing apparatus comprises: a reaction vessel having a first end, a second end, an enclosure, at least one wall, a volume within the enclosure and a residence time component, at least one introduction duct coupled to the reaction vessel, and a turbulence component; wherein the residence time component is sufficient to allow the substantial completion of the desired conversion of NO and/or $NO_2$ (e.g. about 95% or higher conversion, about 98% or higher conversion, or about 99% or higher conversion) of the desired conversion of NO to one or more mineral acids and/or salts thereof, or NO to $NO_2$ so that the resultant stream has about 1:1 molar ratio of $NO/NO_2$). Unexpectedly, a short residence time (the contact time) is needed to accomplish this conversion. For example, the residence time (the contact time) can be about 1.5 seconds or shorter, or about 0.15 seconds or shorter when the first and the second streams are thoroughly mixed.

The reaction vessels may be constructed of materials that are impervious to the first stream and have a volume sufficient to contain the first stream for a period of time that is not less than the residence time (e.g. about 1.5 seconds or shorter when $ClO_2^0$ gas is adsorbed, suspended or dissolved in a liquid/mist stream and the liquid/mist stream is introduced into the reaction vessel via an atomizer, about 0.15 seconds or shorter when $ClO_2^0$ is introduced in a gas stream) when the mixing of the first and the second streams is sufficient. The reaction vessel may be any shape and comprise at least one wall. In certain embodiments, the reaction vessel is cylindrical (i.e. having a circular cross-section profile) because this shape minimizes interference between the first stream and the vessel wall(s). However, when the first and the second streams are gas streams, or when the first stream is a gas stream and the second stream contains very small liquid droplets (e.g. having a mean diameter of about 200 microns or lower, or about 100 microns or lower), any shape of the reaction vessel that allows the mixing of the first and second streams with minimal coalescing of droplets to form moisture within the reaction chamber is contemplated, even if it is not cylindrical. In certain embodiments, no liquid droplets or moisture forms. However, these components should be designed to withstand and address different types of the first stream, treatment conditions and resulting components. Therefore, if the reaction chamber can provide sufficient residence time, along with a lack of moisture coalescence, any design may be used, including without limitation, rectangular, oval, triangular, conical and combinations thereof.

The first stream is introduced to the reaction vessel through the at least one introduction duct coupled to the reaction vessel. For optimum performance, it is desired to design the orientation of the duct to minimize the interference between the gas and the vessel walls. Examples of such optimized orientations for a cylindrical reaction vessel include, without limitation: a) at the center of the end of the cylindrical reaction vessel, and b) at the side and tangentially aligned with circumference of the reaction cylindrical vessel.

The turbulence component may comprise any design or combinations thereof to introduce stream mixing by providing a swirl or turbulence to any stream involved in the method, (e.g. the first stream, the second stream, any component gas/stream thereof; e.g. the $ClO_2^0$ gas stream, the aqueous stream containing $ClO_2^0$, or any combinations thereof). In certain embodiments, the turbulence component is located such that it can add turbulence or mixing to the streams before contacting $ClO_2^0$ gas or $ClO_2^0$ adsorbed, suspended and/or dissolved in a mist or liquid. When $ClO_2^0$ is introduced as a gas the mixing can occur before or after the $ClO_2^0$ is introduced in the second stream, or before or after the $ClO_2^0$ is added to the first stream containing $NO_x$.

In certain embodiments, when the first stream is introduced at the center of the end of a cylindrical reaction vessel, the turbulence component is placed in the duct just prior to the point where the first stream enters the reaction vessel or at the beginning of the reaction vessel just after the first stream enters the vessel. Alternatively, the reaction can occur in a duct without a reaction vessel and the turbulence component is placed in the duct. In certain embodiments, when the first stream is introduced at the side and tangentially aligned with circumference of a cylindrical reaction vessel, the turbulence component can be located at a position to swirl or mix the gas/stream in the duct just prior to the point where the first stream enters the vessel. In certain embodiments, a rectangular or other reaction vessel configuration is used, and the turbulence component is designed in order to minimize the collision between the vessel walls and the gas/stream turbulence within the reaction vessel when $ClO_2^o$ is introduced in a mist or liquid phase.

The requirement for a vessel volume is associated with the methodology of introducing $ClO_2^o$ into the second stream. When the $ClO_2^o$ is present as a gas, the residence time is about 0.15 seconds or less when stream mixing is sufficient. When $ClO_2^o$ is adsorbed, suspended and/or dissolved in a liquid then the residence time is longer, e.g. about 1.5 seconds of residence time with a good mixing between the first and the second streams.

In certain embodiments, $ClO_2^o$ is adsorbed, suspended and/or dissolved in a liquid to form the second stream. The second stream is sprayed, released or propelled into the first stream. In certain embodiments, the second stream is sprayed, released or propelled at a point just downstream of the point at which the first stream is swirled by the turbulence component, through a single or multiple nozzles. In certain examples, it may also be beneficial for the first stream nozzle(s) to spin in opposite directions of the second stream nozzle(s).

In certain embodiments, the nozzle orientation is centered with the axis of the stream flow and provides a full cone or other full surface pattern that evenly disperses the material projected from the nozzle into the entire stream. In certain embodiments, the rate of release from the nozzle may be calibrated so that it is at least twice the velocity of the stream. When the nozzle is emitting a liquid, it preferably produces droplets of that liquid with a mean diameter of about 100 microns or less, or about 200 microns or less. In these instances, it is important to remain below the dew point of the gas, and thereby prevent formation of liquid droplets, especially those with a larger diameter.

Liquid may be formed from a condensed spray in the reaction, but may also be formed from other methods and/or apparatus. Such liquid may contain high concentrations of HCl and $HNO_3$. In certain embodiments, the reaction vessels further comprises a drain at a low point in the vessel to allow the removal of such liquid. In certain embodiments, depending upon other contaminants in the first stream and the pH of the condensed moisture (fluid material) added to the first stream, this condensate acid mix can be of commercial value.

In certain embodiments, the $ClO_2^o$ gas is generated on site and introduced (e.g. sprayed) into the first stream through the nozzle described above, as a liquid or mist stream and/or a gas stream.

In certain embodiments, the rate of $ClO_2^o$ addition is based on the concentration of $NO_x$ in the first stream. In certain embodiments, the $NO_x$ concentration is not consistent in the first stream. The apparatus further comprises automated chemical feed controls to optimize both removal efficiency and scrubber operating costs. An example of the automated chemical feed controls is described in Example 4.

The automated feed controls are designed to detect the NO and $NO_2$ concentration in the untreated first stream, or the NO, $NO_2$ and $ClO_2^o$ concentration at the effluent of the reaction vessel, at a point in the ducting past the reaction chamber, and/or at a point on the exhaust stack. Other control inputs include, without limitation, pressure, flow, concentration, pH and temperature for various components in the process.

In certain embodiments, the apparatus further comprises a blower to push/pull the first stream into the reaction vessel. The blower can be placed before or after the reaction vessel (upstream or downstream of the reaction vessel). In some embodiments, the blower is placed downstream (after) of the reaction vessel. Such placement keeps the ducting and reaction vessel at slightly negative pressure when compared to the atmosphere, and therefore eliminates the release of untreated first stream in the event of a leak. The downstream orientation can also be advantageous because it reduces the pressure in the reaction system slightly below ambient. The lower working pressure enhances the safe working environment for $ClO_2^o$ gas. Furthermore, the blower may have a variable frequency drive with enhanced operational flexibilities. In some embodiments, the air flow through the ventilation system including the reaction vessel may be reduced in volume during the hours when $NO_x$ is not actively generated. This feature is designed to maintain a minimal air exchange in the areas that create the waste gas.

In certain embodiments, the apparatus may further comprise a second mist or packed bed scrubbing apparatus to improve the decontaminated gas quality while enhancing the capture of the mineral acids generated from the process (e.g. HCl and $HNO_3$).

In certain embodiments, when the apparatus is used for the second method disclosed herein, the apparatus further comprises an apparatus to complete the step (2b). Known apparatus can be adapted to complete the step (2b) in the methods disclosed herein. Such apparatus include, but are not limited to, co-current packed bed scrubbers, atomizes mist scrubbers, concurrent packed bed scrubbers, horizontal flow packed bed scrubbers and bubble or tray type scrubbers.

In any of the above embodiments, the same or similar principles may be applied for the treatment of one or more oxides of sulfur. Sulfur-containing compound will not interfere with the methods disclosed herein.

EXAMPLES

Example 1: Single Stage Scrubbing Method

An embodiment of the first method disclosed herein is demonstrated in this example using a single-stage pilot scale mist scrubber. The pilot scrubber processes a slip stream of waste gas at approximately 22° C. from a chemical milling operation. The $NO_x$ concentration in the waste gas stream varies between 10 and 200 ppmV during the series of tests completed to test this new process methodology. However, it should be understood that significantly high concentrations of $NO_x$ can be treated in a waste gas stream, including concentrations of 40,000 ppmV or more. The $NO/NO_2$ ratios in the $NO_x$ may vary slightly, and the NO concentration in the $NO_x$ can be consistently above 90%.

Figure 4:
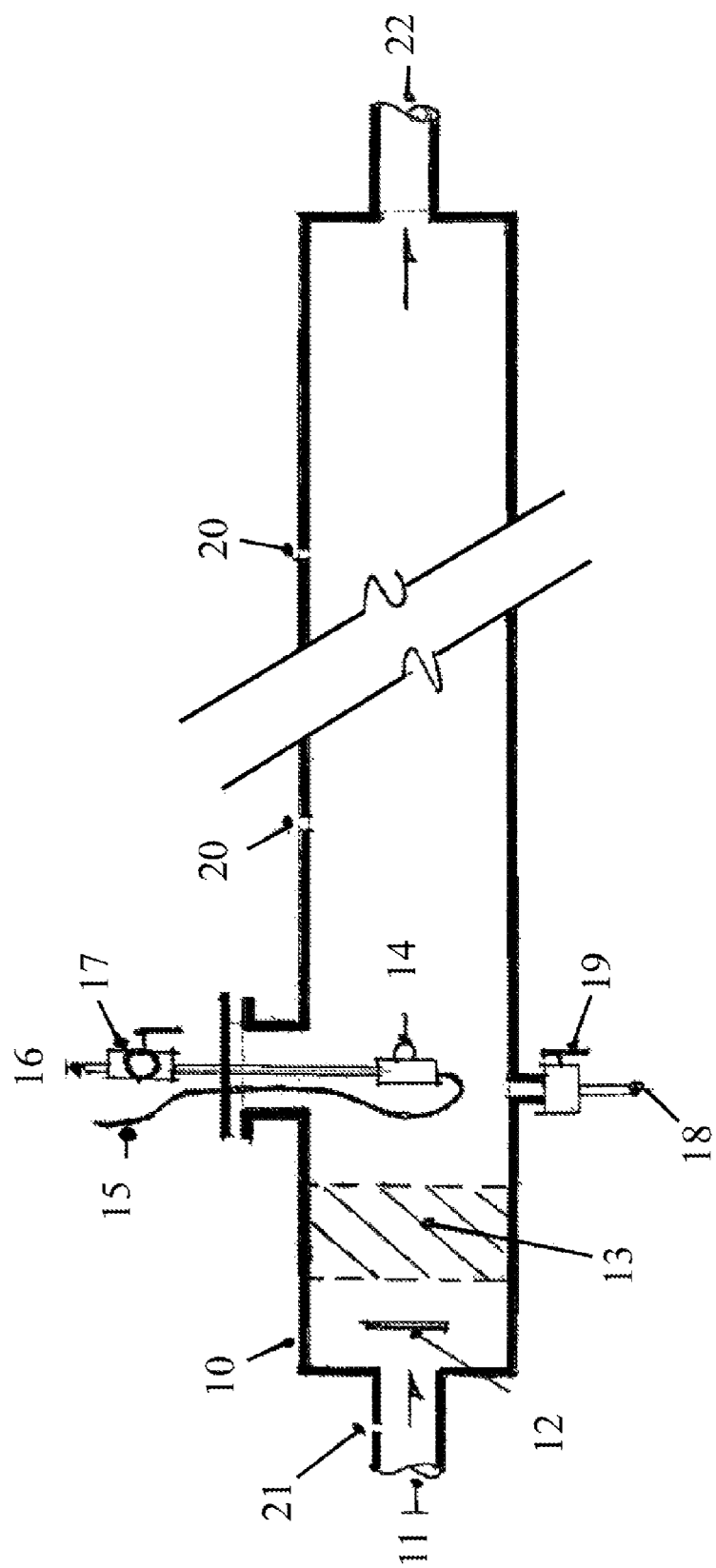
FIG. 4: An apparatus used to perform a single-stage method described herein according to one embodiment.

FIG. 4 shows a section cut through a contemplated embodiment—the single-stage pilot scrubber—that can be used in the performance testing. A scrubber vessel (10) is a PVC pipe mounted horizontally during testing. The vessel (10) in any other configuration and orientation that can provide an enclosure for mist is applicable and included in this description. Waste gas (the first stream) enters the vessel (10) through the PVC pipe (11). A PVC baffle plate (12) disturbs the first stream flow linearity in the vessel (10) prior to a stream swirling device (13). An air atomized nozzle (nozzle) (14) is used in the tests to introduce the second stream to the first stream in the vessel (10). In some tests, the nozzle (14) is used to introduce the second stream as a liquid stream that continues through a tube (15). In other tests, the second stream contains only gas and is introduced to the nozzle through a tube (16). The pressure and flow rate of the stream fed to the nozzle (14) are adjusted at a regulator (17). A hole (20) is used to extract treated stream samples from the vessel (10). The hole (20) is repeated in the vessel (10) at intervals away from the nozzle (14) so that samples with progressively longer residence time in the vessel (10) can be obtained and analyzed to determine the rate of $NO_x$ destruction in the stream within the vessel (10). The rate of $NO_x$ destruction in the vessel (10) is determined by comparing the treated stream samples from the various hole (20) locations against untreated waste gas samples takes at a hole (21). The first stream is moved through the vessel (10) by ducting (22) connected to the suction side of a variable flow rate blower.

The contemplated processes, as outlined earlier, utilize two methods (as described in steps 1a and 1b) in which $ClO_2^0$ effectively converts gas containing both NO and $NO_2$ into one or more mineral acids (e.g. $HNO_3$) and/or salts thereof in a single-stage mist type gas scrubbing apparatus. The method described in step 1a includes a reaction between a gas containing $NO_x$ and $ClO_2^0$ adsorbed, suspended and/or dissolved in a basic solution. The method described in step 1b includes a reaction of a gas with high relative humidity containing $NO_x$ and $ClO_2^0$. Both methods involve reactions (3) and (4) as described supra.

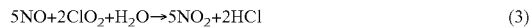
$$5NO + 2ClO_2 + H_2O \rightarrow 5NO_2 + 2HCl \quad (3)$$

$$5NO_2 + ClO_2 + 3H_2O \rightarrow 5HNO_3 + HCl \quad (4)$$

Both methods using a single-stage mist scrubbing apparatus are a major departure from the multi-stage wet scrubbing apparatus reported in prior art.

Greater than 99% removal efficiency of $NO_x$ is accomplished in less than 1.5 seconds when the humid gas containing $NO_x$ and $ClO_2^0$ is well mixed.

An optional second stage mist or wet scrubbing apparatus can provide several functions. First, it removes excess $ClO_2^0$ in the apparatus. This is especially helpful for apparatus without automated controls to effectively regulate $ClO_2^0$ gas addition. Second, it captures HCl, $HNO_3$ acid fumes.

Reactions (3) and (4) occur more rapidly in the mist and gas phase scrubbing technology than the wet scrubbing reactions described in reactions (1) and (2). The increased speed of reaction reduces the reaction vessel size required for conversion of $NO_x$ to the one or more mineral acids or salts thereof. Furthermore, the gas or mist scrubbing methodology using $ClO_2^0$ as described in reactions (3) and (4) is less complicated and requires less maintenance than the packed bed or tray type wet scrubbers that utilize reactions (1) and (2). As a result, the air or mist technology equipment is less expensive to purchase and operate.

Stream analysis for NO and $NO_2$ was done during the pilot testing using electrochemical sensors for NO and $NO_2$. These sensors are evaluated for cross sensitivities by other compounds known or suspected to be in the stream. The sensors are also factory calibrated before and after testing. The electrochemical analysis is further cross checked with EPA Method 07 for $NO_x$.

Example 2: Two Stage Scrubbing Methodology

Figure 5:
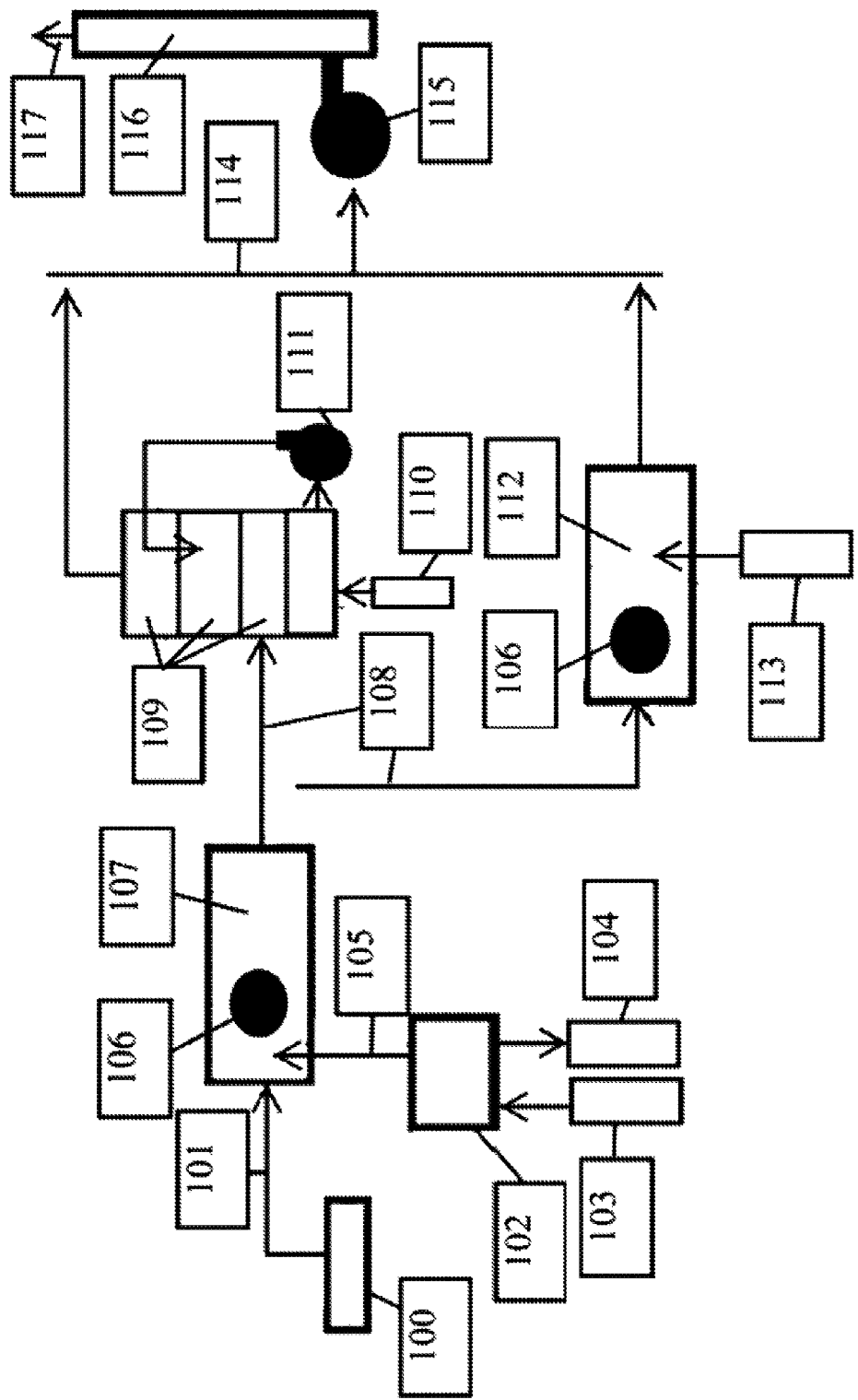
FIG. 5: A flow diagram for an embodiment of a two-stage method described herein.

FIG. 5 shows a possible flow diagram for a two-stage scrubbing method as described herein. The reaction chambers of the two stages are connected (107: the first-stage reaction chamber; and 109 or 112: the second-stage reaction chamber options). Known mechanical methodology, equipment and processes can be adapted to the methods disclosed herein for use in the second stage of the two-stage methodology set forth herein. These include, but are not limited to, co-current packed bed scrubbers, atomizes mist scrubbers, concurrent packed bed scrubbers, horizontal flow packed bed scrubbers and bubble or tray type scrubbers and methods relating to the same. In one embodiment, a full scale application of the methods described herein utilizes the packed bed option (109) as shown as the second stage option in FIG. 5. Referring to FIG. 5, air pulled through an exhaust hood or other device of any configuration (100) contains NO from industrial or combustion processes. Ducting (101) can be made of any material that is compatible with the gases that it conducts between the source of the NO containing air and the first stage reaction chamber (107).

On-site production of $ClO_2^0$: There are a number of effective $ClO_2^0$ generation technologies, but most are limited to only producing the $ClO_2^0$ gas adsorbed, suspended or dissolved in a liquid. The gas phase $ClO_2^0$ can be produced by including a separate gas stripping technology. Electrochemical generation (102) can provide both gas phase $ClO_2^0$ and $ClO_2^0$ adsorbed, suspended or dissolved in a liquid. Each method of $ClO_2^0$ generation requires its own requisite chemicals provided by (103). Waste products from $ClO_2^0$ gas generation vary according to the methodology used. The generation of $ClO_2^0$ gas by an electrochemical methodology produces waste byproducts including NaOH, $NaClO_2$, and $NaClO_3$ in solution. These are utilized in the second stage scrubbing and therefore reduce the need for additional NaOH and other chemicals described in (110) or (113). Other chemical methods of generating $ClO_2^0$ gas produce waste byproducts that are not useful in the second stage scrubbing and therefore must be treated as hazardous waste at an additional operating cost (104). The $ClO_2^0$ gas is generally transferred under slight vacuum to the reaction chambers (107). The slight vacuum is generated because the blower/fan (115) that moves the NO contaminated air (the first stream) from its source (100) to the stack (116) is generally located after the second-stage scrubber (109 or 112). This placement insures the entire air handling system up to the fan/blower (115) is at a negative pressure with respect to atmospheric pressure. The tube (105) used to transfer the $ClO_2^0$ gas from the generator to the first-stage reaction chamber (107) is made from a material that is impervious to $ClO_2$. For $ClO_2^0$ gas safety reasons, this tube (105) is as short as possible. The efficiencies of reactions (3) and (4) are dependent on good mixing of the streams. The details of mixing technology and placement of the mixing device (106) with respect to the introduction of the second stream to the first-stage reaction chamber (107) of the scrubber or the fourth stream to a second-stage reaction chamber (112) of the scrubber are described elsewhere in this report. The first stage reaction chamber (107) is made of materials that are compatible with the gases being treated. The chamber volume, shape and orientation are described herein. The purpose of the chamber is to provide a sufficient volume of a confined space for the production of the desired reaction product. In a two-stage scrubbing method, the first-stage reaction provides 1:1 molar ratio of NO and $NO_2$. This volume of the reaction chamber (107) provides sufficient residence time for reaction (3) to reach the desired end point. The second-stage reaction chamber can utilize several conventional methodologies in novel ways as described herein. These conventional methodologies include, but are not limited to, counter current packed bed scrubber and aerosol mist reaction chamber. In FIG. 5, (108) means a choice can be made for the system to use either a packed bed scrubber (109) as the second-stage reaction chamber (109), or alternatively, an aerosol mist reaction chamber as the second-stage reaction chamber (112). Counter current packed bed scrubber methodology is documented in literature but this particular application of the technology is novel when a packed bed scrubber (109) is used to remove both NO and $NO_2$ in about 1:1 molar ratio with the methods described herein. The chemical mixture (110) that facilitates 1:1 molar conversion of NO and $NO_2$ into $NaNO_2$ as described in reaction (6) are NaOH, with one or more oxidizers e.g. $NaClO_2$ and/or $ClO_2$ and/or $NaClO_3$ and/or NaOCl and/or $H_2O_2$. Each of these oxidizers enhances the extent to which the NO and $NO_2$ are transformed into the desired compounds. A recirculation pump (111) is typically a part of the packed bed scrubber technology. This pump (111) transfers a liquid that can be $H_2O$ optionally containing the chemicals as described supra in (110) from the scrubber sump to a point above the scrubber packing bed(s) in order to keep the packing material wetted. The chemical reactions between $NO_x$, NaOH and the other chemicals as described in item (110) occur in the film layer surrounding the surface of each piece of packing in (109).

Alternatively, mist or atomized droplets may be used in an aerosol mist reaction chamber (112) to scrub airborne contaminants as commonly used for the conversion of hydrogen sulfide and other sulfur containing compounds, but it is novel for the conversion of $NO_x$ (NO and $NO_2$) according to reaction (6) in an aerosol mist reaction chamber as the second-stage reaction chamber (112). This reaction chamber (112) is made of materials that are compatible with the chemicals it will be exposed to. The reaction chamber (112) is sized to provide the residence time necessary for completion of the reaction (6) to the level of removal efficiency required. Longer residence time results in higher removal efficiency. Additional information on the second-stage reaction chamber (112) is described herein. Chemicals utilized in the aerosol mist reaction chamber are provided from item (113) and are the same as those identified in item (110) above. The method of introduction of the fourth stream to the second-stage reaction chamber (112) is dramatically different from that in the packed bed scrubber (109). The chemicals described in (110) are added to the sump of the packed bed scrubber (109) and transferred to a wet film on the packing within the packed bed scrubber (109). In the aerosol mist reaction chamber (112) the chemicals described in (110) are introduced in a mist with a mean diameter of about 100 microns or a mean diameter of about 200 microns. The mist is made by a variety of means including air atomized nozzles, and diametrically opposed gas/liquid stream impingement nozzles and sonic nozzles in various configurations. The shape of the reaction chamber (112) and nozzle(s) orientations are configured in ways that optimize interaction between the streams while minimizing the coalescing of droplets within the reaction chamber (112). Ducting (114) is similar to that described in item (101). The fan/blower (115) is typically located after the reaction chambers. This orientation insures the entire air handling system from (100) up to the fan (115) is at a slightly negative pressure when compared to the atmosphere. This orientation enhances the safety of $ClO_2^0$ in the first-stage reaction chamber and also insures that any leak in the mechanical system will entrain ambient air rather than discharge contaminated air into the atmosphere. The blower/fan (115) is made from materials that are compatible with the chemical in the air stream and sized to accommodate the site specific differential pressure and gas flow requirements. An exhaust stack (116) is designed to meet regulatory compliance requirements for dispersion modeling and other parameters. The stack (116) is made from materials that are compatible with the gas that passes through it. Clean air (117) is a relative term that is mandated by local regulatory agencies. This process addresses $NO_x$ abatement issues and has the propensity to meet removal efficiencies of about 95% or more, about 98% or more, about 99% or more. The exit arrow (117) represents clean air. This process has the ability to create differences in $NO_x$ removal efficiency through differences in the design of the equipment. The differences in equipment design include but are not limited to reaction vessel residence times, gas mixing, nozzle types and placement and chemical dosing.

There are advantages to the selection of an electrochemical method of $ClO_2^0$ generation. The equipment cost of electrochemical generation is higher than two and three chemical methods of $ClO_2^0$ generation, but all or part of this difference is offset by the cost of gas stripping technology necessary to produce the requisite gas phase $ClO_2^0$ used in the $NO_x$ process associated with reactions (3) and (4). The electrochemical equipment cost differential is often outweighed by the advantages of lower costs associated with disposing of chemical waste products associated with $ClO_2^0$ generation. Almost no chemical waste is produced with the electrochemical generation process because the reaction byproducts include sodium hydroxide and are utilized in the second-stage scrubber. The chemical waste produced from other $ClO_2^0$ generation processes may not be reused in the second-stage scrubbing.

Example 3: Forms of $ClO_2^0$ Introduction $ClO_2^0$ was introduced to the stream comprising $NO_x$ by three ways: in a gas stream, in a mist stream or in a liquid stream. These three methods used the same stoichiometry, because it is $ClO_2^0$ that reacted with $NO_x$, and not the $ClO_2^1$ anion. Moreover, regardless of the method of introduction of the $ClO_2^0$, the reaction occurred with gas-phase $ClO_2^0$ which was either introduced into the reaction vessel in the gas phase or which evaporated upon introduction by an atomizer and prior to contacting the first stream. Thus, the methods disclosed herein were significantly different from the wet scrubbing of NO using the $ClO_2^-$ anion to react with $NO_x$.

Mechanical Configuration:

The gas and mist stream systems have different mechanical configurations: different nozzle types, different sequences of mixing, and different phases for $ClO_2^0$ transportation into the reaction chamber. In the gas stream, mixing after the gas injection worked better than the opposite sequence. In the mist stream systems, in certain examples, the issue of droplet aggregation superseded this mixing advantage because mixing after the gas injection tended to cause droplet agglomeration. Therefore mixing was and is introduced prior to $ClO_2^0$ addition when the mist stream is used.

Mist Stream:

Mist stream was initially developed for operations with modest waste gas flow rates (the first stream) and modest $NO_x$ concentrations in the waste gas. This method is cost effective for a first stream flow rates of about 10,000 CFM or less and $NO_x$ concentrations of about 1,000 ppmV or less. Subsequent studies revealed that this methodology is applicable to larger waste gas flow rates and $NO_x$ concentrations.

This process is also cost effective for smaller applications. $ClO_2^0$ was supplied in the form as adsorbed, suspension and/or dissolved in a liquid composition (e.g. an aqueous solution buffered to minimize off-gassing so that the cost of onsite $ClO_2^0$ generation was no longer needed). Applications involving larger waste gas flow rates are cost effective when onsite $ClO_2^0$ generation is used.

Liquid containing $ClO_2^0$ is commercially available up to about 3,000 ppmV $ClO_2^0$. A 3,000 ppmV solution was the maximum concentration considered stable for transport. Higher concentrations up to about 19,000 ppmV are possible when $ClO_2^0$ is generated on site at fixed locations and stored in liquid that is maintained at a lower temperature (see FIG. 3 for details).

Gas Stream:

Industrial waste gas streams (the first stream) of a wide range of volumes and $NO_x$ concentrations were effectively treated when the second stream containing $ClO_2^0$ was a gas stream and introduced into the first stream before the mixture was further mixed. This application required onsite generation of $ClO_2^0$ gas and was therefore more economically cost effective when the first stream was in excess of approximately 10,000 CFM and the $NO_x$ loading was 50 ppmV or more. The process was and is applicable to $NO_x$ loading as high as 60,000 ppmV. This gas stream process was and is at least 10 times faster than the mist stream process, as described above. This considerably faster gas phase reaction dramatically reduced the size of the reaction vessel or even eliminated it completely.

Example 4: An Example of Automated Chemical Feed Controls

An automated control system can be designed and built to monitor, operate and control all of the equipment for any scale application of this $NO_x$ abatement process utilizing reactions (3) and (4). The control system can be connected to the following components:

An extensive array of sensors and detectors to monitor process conditions in each aspect of the overall system.

A generator capable of producing $ClO_2^0$ in a gas phase or adsorbing, suspending and/or dissolving $ClO_2^0$ in a liquid composition.

A single first-stage $NO_x$ scrubber using gas and/or mist stream containing $ClO_2^0$ to convert $NO_x$ into one or more mineral acids (e.g. nitric acid) and/or salts thereof, and to optionally generate other molecules.

A second-stage packed bed scrubber, tray tower or mist/gas phase scrubber or other device designed to create a contact and mixing between the waste gas stream and any molecules added to treat $NO_x$ and/or the mineral acids generated during the first stage process. The second stage can recirculate a liquid containing, effluent from the $ClO_2^0$ generator, and other chemical additives described in (110 and 113 above) including sodium hypochlorite (NaOCl) and hydrogen peroxide ($H_2O_2$).

A system to strip $ClO_2^0$ gas stored in an aqueous composition and to inject it into the reaction chamber of the first-stage $NO_x$ scrubber (the first-stage reaction chamber (107)). The $ClO_2^0$ stripped from water can be used to supplement $ClO_2^0$ gas being concurrently made by the $ClO_2^0$ generator (102) and augment the amount injected into the first-stage reaction chamber (107). The aqueous composition containing $ClO_2^0$ can be made by the $ClO_2^0$ generator during periods when the industrial facility is not actively generating $NO_x$.

Fans, both direct and variable frequency drive.

A storage and packaging system for $ClO_2^0$ gas stored in an aqueous composition (used to optimize the $ClO_2^0$ generator production by making $ClO_2^0$ and storing it in an aqueous composition during times of the day when $NO_x$ was not being produced).

A communication system via internet for remote process monitoring and upgrades. The control systems can also manage the attached equipment in three modes of operation:

Operating the above equipment during the business hours to treat $NO_x$ generated in the industrial applications. During these periods, the $ClO_2^0$ generator can produce $ClO_2^0$ in a gas phase for direct injection into the first-stage reaction chamber.

When the industrial facility is not operating and therefore not generating $NO_x$, the $ClO_2^0$ generator can produce $ClO_2^0$ gas that is adsorbed, suspended and/or dissolved (i.e., stored) in an aqueous composition comprising, for example, deionized water. The obtained liquid can be used to supplement gas phase $ClO_2^0$ made by the $ClO_2^0$ generators and thereby provided an augmented amount of $NO_x$ than could have been provided by the $ClO_2^0$ generators alone during periods when $NO_x$ is produced by the industrial facility.

Operating the above equipment during the business hours to treat $NO_x$ generated in the industrial applications using both $ClO_2^0$ gas produced by the $ClO_2^0$ generator and $ClO_2^0$ gas stripped from aqueous solution stored on site.

Thus, the specific embodiments and methods of the removal of NO and/or $NO_2$ from a first stream, including a discussion of related apparatus, processes and uses thereof have been disclosed herein. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A method comprising:
    contacting a first stream comprising NO and/or $NO_2$ ($NO_x$) with a second stream comprising chlorine dioxide to convert the $NO_x$ in the first stream to acids and/or salts thereof in a single-stage gas phase conversion; wherein the first stream is agitated before, during or after the contact with the second stream; and
    wherein the velocity of the first stream is less than about 10,000 feet per minute.

2. The method of claim 1, wherein chlorine dioxide is gas phase non-ionic chlorine dioxide ($ClO_2^0$) and the concentration of the ($ClO_2^0$) in the second stream is about 8,000 ppmV or lower.

3. The method of claim 1, wherein the concentration of the $NO_x$ in the first stream is about 1 to about 60,000 ppmV.

4. The method of claim 1, further comprising determining the amount/rate of chlorine dioxide additions to the second gas stream based on the concentration of NO and/or $NO_2$ and their dimers in the first stream.

5. The method of claim 1, wherein said step of contacting takes place in a reaction vessel, the method further comprising:
using one or more sensors to monitor the concentration of reactants and one or more reaction environment parameters to efficiently and safely regulate the addition of chlorine dioxide into said reaction vessel.

6. The method of claim 1, wherein the contact time of the first and the second streams is about 3.0 seconds or shorter.

7. The method of claim 1, wherein the second stream comprises a mist stream, and is provided by the following steps:
providing gas phase chlorine dioxide;
adsorbing and/or suspending said gas phase chlorine dioxide gas into a liquid composition; and
introducing the liquid composition adsorbed and/or suspended with said gas phase chlorine dioxide into a reaction chamber through an atomizer to evaporate said liquid composition upon entry into said reaction chamber.

8. A method comprising:
contacting a first stream comprising at least one atmospheric pollutant with a second stream comprising gas phase nonionic chlorine dioxide ($ClO_2^0$) to convert said at least one atmospheric pollutant in the first stream to one or more other molecules in a single-stage gas phase reaction;
wherein said at least one atmospheric pollutant is selected from the group consisting of compounds in the nitrogen oxides ($NO_x$) group and/or a compound(s) selected from the sulfur oxides ($SO_x$) group; and
wherein the first stream is agitated before, during, or after the contact with the second stream.

9. The method of claim 8, wherein the velocity of the first stream is less than about 10,000 feet per minute.

10. The method of claim 8, wherein the second stream comprises a mist stream, and is provided by the following steps:
providing gas phase ($ClO_2^0$);
adsorbing and/or suspending said gas phase ($ClO_2^0$) into a liquid composition; and
introducing the liquid composition adsorbed and/or suspended with ($ClO_2^0$) gas into a reaction chamber through an atomizer to evaporate said liquid composition upon entry into said reaction chamber;
wherein some or all of said nonionic chlorine dioxide gas in said second stream is suspended in said liquid composition.

11. The method of claim 8, wherein said step of contacting takes place in a reaction vessel, the method further comprising:
using one or more sensors to monitor the concentration of reactants and one or more reaction environment parameters to efficiently and safely regulate the addition of ($ClO_2^0$) into said reaction vessel.

12. A method comprising:
contacting a first stream comprising at least one atmospheric pollutant selected from the group consisting of compounds in the nitrogen oxides (NOx) group and/or a compound(s) selected from the sulfur oxides (SOx) group with a second stream comprising gas phase chlorine dioxide to provide a third stream via a gas phase reaction; and
contacting said third stream with a fourth stream, said fourth stream comprising an aqueous solution containing at least one metal hydroxide (MOH).

13. The method of claim 12, wherein said fourth stream further comprises one or more oxidants selected from the group comprising NaOCl, $NaClO_2$, $NaClO_3$, $H_2O_2$, $KMnO_4$, $O_3$ and combinations thereof.

14. The method of claim 13, wherein the total amount of said one or more oxidants is about 2% to about 6% by weight of said aqueous solution.

15. The method of claim 13, wherein said one or more oxidants are not mixed into said aqueous solution prior to said step of contacting said third stream with said fourth stream.

16. The method of claim 12, wherein said step of contacting said third stream with said fourth stream takes place in a reaction chamber, and wherein said fourth stream is provided by spraying, releasing, or propelling said aqueous solution into said reaction chamber.

17. The method of claim 12, wherein said method takes place in a reaction vessel, the method further comprising:
using one or more sensors to monitor the concentration of reactants and one or more reaction environment parameters to efficiently and safely regulate the addition of one or more of chlorine dioxide, MOH, NaOCl, $NaClO_2$, $NaClO_3$, $H_2O_2$, $KMnO_4$, and $O_3$ into said reaction vessel.

18. The method of claim 12, wherein said step of contacting said first and second streams occurs in a first reaction chamber, and further comprising the step of transferring said third stream to a second reaction chamber, wherein said step of contacting said third stream with said fourth stream occurs in said second reaction chamber.

19. The method of claim 12, wherein the second stream comprises a mist stream, and is provided by the following steps:
providing chlorine dioxide in the form of nonionic ($ClO_2^0$);
adsorbing and/or suspending said gas phase ($ClO_2^0$) into a liquid composition; and
introducing the liquid composition adsorbed and/or suspended with said gas phase ($ClO_2^0$) into a reaction chamber through an atomizer to evaporate said liquid composition upon entry into said reaction chamber;
wherein some or all of said nonionic chlorine dioxide gas in said second stream is suspended in said liquid composition.

20. A method comprising:
contacting a first stream comprising at least one atmospheric pollutant with a second stream comprising gas phase nonionic chlorine dioxide)($ClO_2^0$) to provide a third stream via a gas phase reaction wherein the first stream is agitated before, during or after the contact with the second stream; and
contacting said third stream with a fourth stream, said fourth stream comprising an aqueous solution containing at least one metal hydroxide (MOH);
wherein at least one atmospheric pollutant is selected from the nitrogen oxide (NOx) group and/or a compound selected from the sulfur dioxide ($SO_x$) group.

21. The method of claim 20, wherein said fourth stream further comprises one or more oxidants selected from the group comprising NaOCl, $NaClO_2$, $NaClO_3$, $H_2O_2$, $KMnO_4$, $O_3$ and combinations thereof.

22. The method of claim 21, wherein the total amount of said one or more oxidants is about 2% to about 6% by weight of said aqueous solution.

23. The method of claim 21, wherein said one or more oxidants are not mixed into said aqueous solution prior to said step of contacting said third stream with said fourth stream.

24. The method of claim 20, wherein said step of contacting said third stream with said fourth stream takes place in a reaction chamber, and wherein said fourth stream is provided by spraying, releasing, or propelling said aqueous solution into said reaction chamber.

25. The method of claim 20, wherein said step of contacting said first and second streams occurs in a first reaction chamber, and further comprising the step of transferring said third stream to a second reaction chamber, wherein said step of contacting said third stream with said fourth stream occurs in said second reaction chamber.

26. The method of claim 20, wherein said method occurs in a reaction vessel, the method further comprising:
using one or more sensors to monitor the concentration of reactants and one or more reaction environment parameters to efficiently and safely regulate the addition of one or more of $(ClO_2^0)$, MOH, NaOCl, $NaClO_2$, $NaClO_3$, $H_2O_2$, $KMnO_4$, and $O_3$ into said reaction vessel.

* * * * *